United States Patent
Dalal et al.

(10) Patent No.: US 7,069,011 B2
(45) Date of Patent: Jun. 27, 2006

(54) SYSTEM AND METHOD FOR RELIABLE ACKNOWLEDGMENT BETWEEN A MOBILE STATION AND A BASE STATION IN A WIRELESS NETWORK

(75) Inventors: Neerav N. Dalal, Plano, TX (US); Sanjay D. Kulkarni, Plano, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 229 days.

(21) Appl. No.: 10/006,315

(22) Filed: Nov. 13, 2001

(65) Prior Publication Data

US 2003/0092442 A1    May 15, 2003

(51) Int. Cl.
*H04Q 7/20* (2006.01)

(52) U.S. Cl. .................. 455/450; 455/560; 455/561; 455/458

(58) Field of Classification Search .......... 455/434, 455/450, 455, 507, 509, 511, 515, 560, 458; 370/329, 431, 468, 348, 341
See application file for complete search history.

(56) References Cited

U.S. PATENT DOCUMENTS

| | | | | |
|---|---|---|---|---|
| 6,104,709 | A * | 8/2000 | Rinchiuso et al. | 370/432 |
| 6,167,248 | A * | 12/2000 | Hamalainen et al. | 455/561 |
| 6,185,428 | B1 * | 2/2001 | Kingdon et al. | 455/450 |
| 6,317,435 | B1 * | 11/2001 | Tiedemann et al. | 455/67.11 |
| 6,633,554 | B1 * | 10/2003 | Dalal | 370/342 |
| 6,636,496 | B1 * | 10/2003 | Cho et al. | 370/342 |
| 6,731,905 | B1 * | 5/2004 | Ogino et al. | 455/11.1 |
| 2002/0160812 | A1 * | 10/2002 | Moshiri-Tafreshi et al. | 455/561 |

* cited by examiner

*Primary Examiner*—Joseph Feild
*Assistant Examiner*—Kamran Afshar

(57) ABSTRACT

For use in a wireless communication network, an apparatus for sending and receiving an acknowledgment message. The apparatus comprises: 1) a channel controller capable of assigning a common control channel to a mobile station wherein the channel controller is capable of dedicating the common control channel to the mobile station for a predetermined period of time; and 2) a transceiver coupled to the channel controller capable of transmitting and receiving the acknowledgment message on the common control channel.

20 Claims, 6 Drawing Sheets

SYSTEM AND METHOD FOR RELIABLE ACKNOWLEDGMENT BETWEEN A MOBILE STATION AND A BASE STATION IN A WIRELESS NETWORK

TECHNICAL FIELD OF THE INVENTION

The present invention is directed, in general, to wireless communications and, more specifically, to a system for mobile station and base station acknowledgments in a wireless network.

BACKGROUND OF THE INVENTION

Wireless communication systems, including cellular phones, paging devices, personal communication services (PCS) devices, and wireless data networks, have become ubiquitous in society. The prices of end-user wireless devices, such as cell phones, pagers, PCS systems, and wireless modems, have been driven down to the point where these devices are affordable to nearly everyone and the price of a wireless device is only a small part of the total cost to the end-user. To continue to attract new customers, wireless service providers concentrate on reducing infrastructure costs and operating costs, and on increasing handset battery lifetime, while improving quality of service in order to make wireless services cheaper and better.

To maximize usage of the available bandwidth, a number of multiple access technologies have been implemented to allow more than one subscriber to communicate simultaneously with each base station (BS) in a wireless system. These multiple access technologies include time division multiple access (TDMA), frequency division multiple access (FDMA), and code division multiple access (CDMA). These technologies assign each system subscriber to a specific traffic channel that transmits and receives subscriber voice/data signals via a selected time slot, a selected frequency, a selected unique code, or a combination thereof.

CDMA technology is used in wireless computer networks, paging (or wireless messaging) systems, and cellular telephony. In a CDMA system, mobile stations and other access terminals (e.g., pagers, cell phones, laptop PCs with wireless modems, and the like) and base stations transmit and receive data in assigned channels that correspond to specific unique codes. Conventionally, user voice and user data traffic are transmitted in traffic channels between a base station and a mobile station and network control signals used to set up and tear down a traffic channel are transmitted between a base station (BS) and a mobile station (MS) using control channels such as the paging channel and the access channel.

Channels that carry voice, data or control signals from the base station to the mobile station are referred to as forward channels and channels that carry voice, data or control signals from the mobile station to the base station are referred to as reverse channels. Most wireless voice services use a message flow comprising a page message from a base station to a mobile station, a page response message from the mobile station, and a traffic channel assignment message from the base station to the mobile station. In third generation CDMA systems that are currently being deployed, non-traffic channels are sometimes implemented as shared common control channels that can be configured to selectively perform paging and access functions.

Push applications use the above-described message flow in which a base station (BS) sends data to a mobile station (MS) and the mobile station acknowledges receipt of the message. Examples of push applications are subscriptions for delivery of headline news, stock quotes, weather, sports, and the like to a subscriber wireless device. Other examples include mobile station updates of MS diagnostics and updates of quality of service (QoS) parameters. To perform a push application, the base station sends a Data Burst message or a Feature Notification message on a forward common (shared) channel. If the Data Burst message requires an acknowledgment, the mobile station (MS) sends a MS Acknowledgment (ACK) Order message on a reverse common channel.

However, data services and other enhanced value-added services may over-utilize a common channel where there is a frequent need for common channel acknowledgment. Since the reverse common channel is not collision-free, multiple mobile stations may be accessing the common channels simultaneously. To ensure that the MS ACK Order message is received by the base station, the mobile station may use multiple access probes at gradually increasing power. The MS access probes start out on the reverse channel at a low power and the mobile station looks for a response from the base station after each re-transmission of the MS ACK Order message. This method of message acknowledgment increases latency, decreases system capacity and wastes power.

There is therefore a need in the art for an apparatus and related method for reliably sending an acknowledgment message between a base station and a mobile station. In particular, there is a need for systems and methods for transmitting MS ACK Order messages from a mobile station to a base station with minimum re-transmission of multiple access probes.

SUMMARY OF THE INVENTION

To address the above-discussed deficiencies of the prior art, it is a primary object of the present invention to provide, for use in a wireless communication network, an apparatus for sending and receiving an acknowledgment message. According to an advantageous embodiment of the present invention, the apparatus comprises: 1) a channel controller capable of assigning a common control channel to a mobile station wherein the channel controller is capable of dedicating the common control channel to the mobile station for a predetermined period of time; and 2) a transceiver coupled to the channel controller capable of transmitting and receiving the acknowledgment message on the common control channel.

According to one embodiment of the present invention, the base station is capable of broadcasting a paging message to the mobile station.

According to another embodiment of the present invention, the paging message comprises identification of the common control channel.

According to still another embodiment of the present invention, the base station further comprises a timer associated with the channel controller for regulating the time that the common control channel is available for the mobile station.

According to yet another embodiment of the present invention, the base station is capable of assigning the common control channel to the mobile station for receiving at least one message from the mobile station.

According to a further embodiment of the present invention, the paging message provides limits for the time period for receiving the acknowledgement message from the mobile station.

According to a still further embodiment of the present invention, the paging message comprises a forward channel message including fields for identifying the forward channel message as a reliable ACK message specifying a dedicated common control channel address and identity.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. In particular, a controller may comprise a data processor and an associated memory capable of storing instructions that are executed by the data processor. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
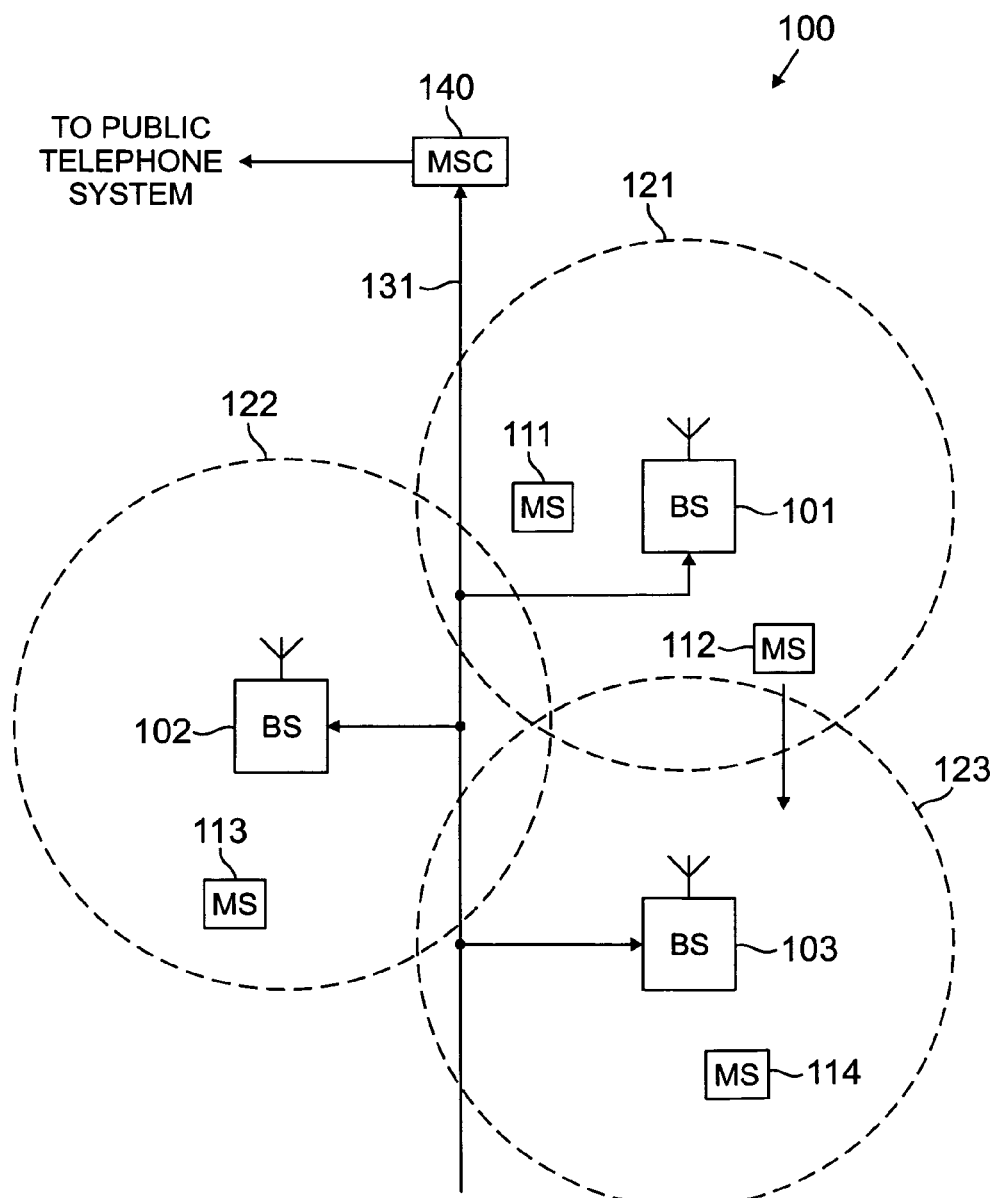
FIG. 1 illustrates an exemplary wireless network according to one embodiment of the present invention.

FIG. 1 illustrates exemplary wireless network 100 according to one embodiment of the present invention. Wireless network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable cellular devices, including conventional cellular telephones, PCS handset devices, portable computers, metering devices, and the like.

Dotted lines show the approximate boundaries of the cells sites 121–123 in which base stations 101–103 are located. The cell sites are shown approximately circular for the purposes of illustration and explanation only. It should be clearly understood that the cell sites may have other irregular shapes, depending on the cell configuration selected and natural and man-made obstructions.

In one embodiment of the present invention, BS 101, BS 102, and BS 103 may comprise a base station controller (BSC) and one or more base transceiver sub-systems (BTS). Base station controllers and base transceiver subsystems are well known to those skilled in the art. A base station controller is a device that manages wireless communications resources, including the base transceiver subsystem, for specified cells within a wireless communications network. A base transceiver subsystem comprises the RF transceivers, antennas, and other electrical equipment located in each cell site. This equipment may include air conditioning units, heating units, electrical supplies, telephone line interfaces, and RF transmitters and RF receivers.

In a typical wireless network, a base transceiver subsystem is at the center of each cell site. Frequently, multiple base transceiver subsystems may be connected to a single base station controller and multiple base station controllers may be connected to a single mobile switching center, such as mobile switching center (MSC) 140. However, for the purpose of simplicity and clarity in explaining the operation of the present invention, the base transceiver subsystem(s) and the associated base station controller(s) for each of cells 121, 122, and 123 are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system.

Communications line 131 may be any suitable connection means, including a T1 line, a T3 line, a fiber optic link, a network backbone connection, and the like. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. The MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a handoff will occur.

As is well known, the handoff procedure transfers control of a call from a first cell to a second cell. For example, if MS 112 is in communication with BS 101 and senses that the signal from BS 101 is becoming unacceptably weak, MS 112 may then switch to a BS that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An idle handoff is a handoff between cells of a mobile device that is communicating in the control or paging channel, rather than transmitting voice and/or data signals in the regular traffic channels.

Figure 2:
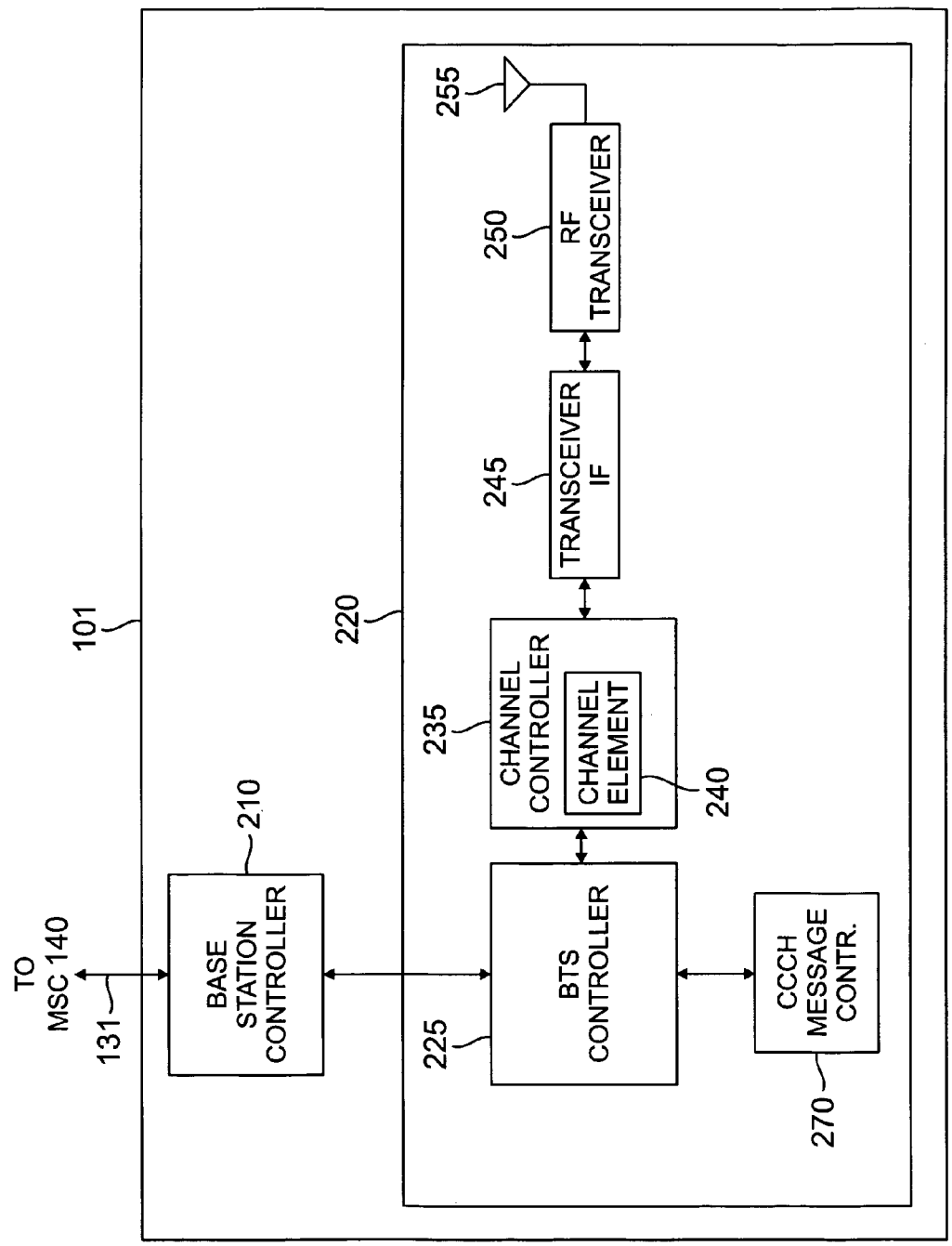
FIG. 2 illustrates in greater detail an exemplary base station according to one embodiment of the present invention.

FIG. 2 illustrates in greater detail exemplary base station 101 according to an exemplary embodiment of the present invention. Base station 101 comprises base station controller (BSC) 210 and base transceiver subsystem (BTS) 220. Base station controllers and base transceiver subsystems were described previously in connection with FIG. 1. For the purposes of simplicity and clarity in explaining the operation of the present invention, only a single exemplary base transceiver subsystem and a single exemplary base station controller are shown in FIG. 2. BSC 210 manages the resources in cell site 121, including BTS 220. BTS 220 comprises BTS controller 225, channel controller 235, which contains one or more representative channel elements 240, transceiver interface (IF) 245, RF transceiver unit 250, antenna array 255, and common control channel (CCCH) message controller 270. According to the principles of the present invention, common control channel (CCCH) message controller 270 is responsible for assigning a mobile station to a semi-dedicated control channel in which the mobile station may respond to a Data Burst message or a Feature Notification message transmitted the base station.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A forward channel refers to outbound signals from the base station to the mobile station and a reverse channel refers to inbound signals from the mobile station to the base station. Transceiver IF 245 transfers the bi-directional channel signals between channel controller 235 and RF transceiver unit 250.

Antenna array 255 transmits forward channel signals received from RF transceiver unit 250 to mobile stations in the coverage area of BS 101. Antenna array 255 also sends to transceiver 250 reverse channel signals received from mobile stations in the coverage area of BS 101. Additionally, RF transceiver 250 may contain an antenna selection unit to select among different antennas in antenna array 255 during both transmit and receive operations.

Figure 3:
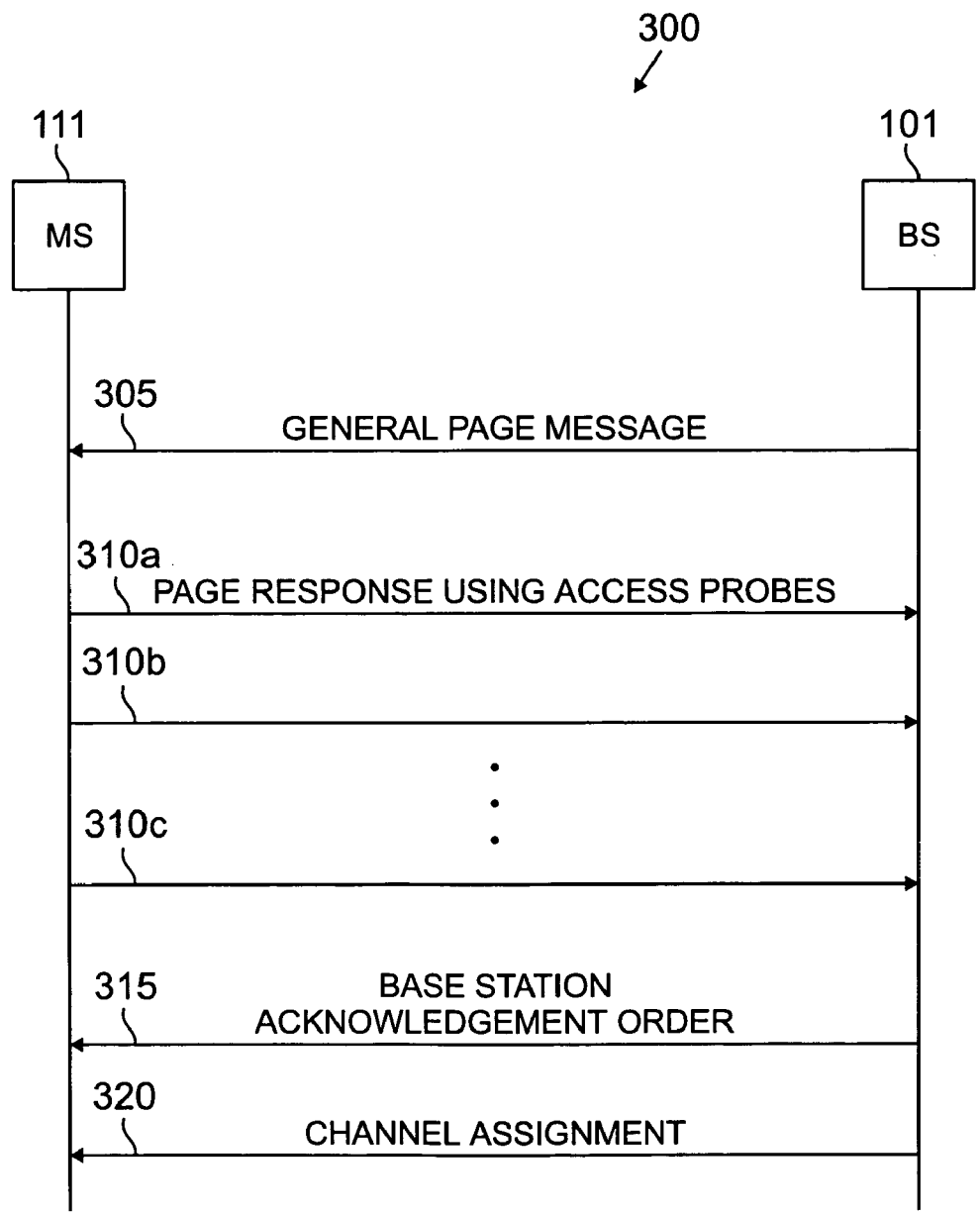
FIG. 3 illustrates a message flow diagram in which a base station initiates a data or value-added service message flow by assigning a dedicated traffic channel according to an exemplary embodiment of the prior art.

FIG. 3 illustrates message flow diagram 300, in which base station 101 initiates a data or value-added service message flow by assigning a dedicated traffic channel according to an exemplary embodiment of the prior art. Base station (BS) 101 transmits General Page message 305 to mobile station (MS) 111 on a forward common channel (typically a paging channel). MS 111 responds by sending Page Response message 310 on the reverse common channel (access channel) using successive access probes. In this instance, the access probes are Page Response messages 310a, 310b, and 310c, which are transmitted with incremental increases in power until MS 111 receives Base Station (BS) Acknowledgment (ACK) Order message 315. Access probes are designed to overcome interference blocking communication between MS 111 and BS 101 with the minimum power expended.

Thus, MS 111 sends access probes at gradually increasing power until MS 111 receives BS ACK Order message 315 from BS 101. However, a channel that is operating near capacity has a high level of interference and requires a high-level of power to overcome the interference. After sending BS ACK order message 315, BS 101 transmits (traffic) Channel Assignment message 320 to MS 111. MS 111 then communicates with BS 101 via the assigned forward and reverse traffic channels.

Figure 4:
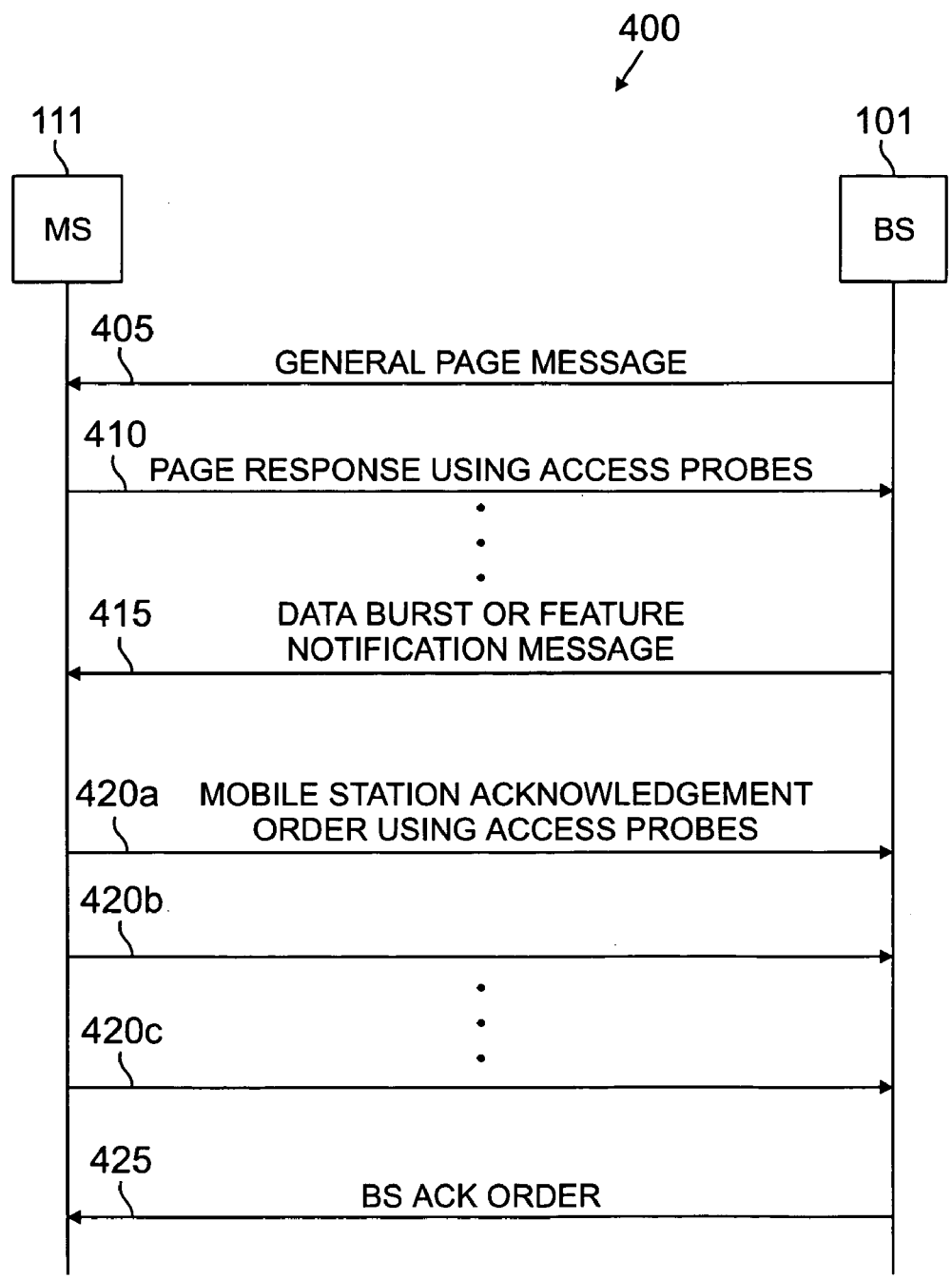
FIG. 4 illustrates a message flow diagram in which a base station initiates a data or value-added service message flow according to an exemplary embodiment of the prior art.

FIG. 4 illustrates message flow diagram 400, in which base station 101 initiates a data or value-added service message flow according to an exemplary embodiment of the prior art. BS 101 transmits General Page message 405 to MS 111 on a forward common channel, such as a paging channel. MS 111 responds by sending Page Response message 410 on the reverse common channel (access channel) using successive access probes, as in FIG. 3. As before, the access probes are transmitted with incremental increases in power until MS 111 receives Data Burst message 415 (or Feature Notification message 415).

If MS 111 properly receives Data Burst (Feature Notification) message 415, MS 111 transmits Mobile Station (MS) Acknowledgment (ACK) order message(s) 420a, 420b, and 420c using multiple access probes at gradually increasing power until MS 111 receives BS ACK Order message 425 from BS 101. As before, the MS 111 access probes start out on the reverse channel at low power and MS 111 looks for a response from BS 101 after each access probe. The reverse channel is not collision free and the collision probability increases as the system approaches near full capacity. Also, MS 111 transmits data fields related to mobile station identity and pilot channel reports that in some cases are not needed. This method of message acknowledgment increases latency, decreases system capacity and wastes power.

Figure 5:
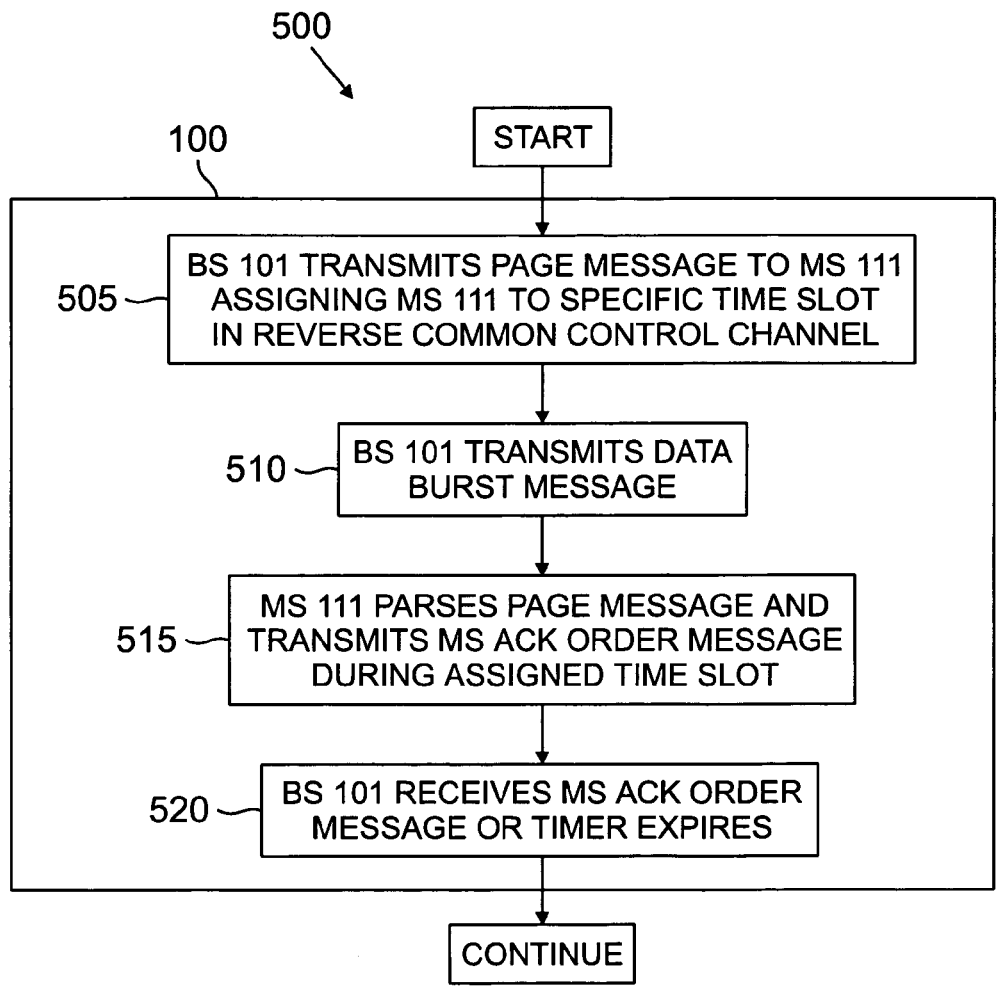
FIG. 5 is a flow diagram illustrating a reliable acknowledgment message operation in the exemplary wireless network according to one embodiment of the present invention.

FIG. 5 depicts flow diagram 500, which illustrates a reliable acknowledgment message operation in exemplary wireless network 100 according to one embodiment of the present invention. Common control channel (CCCH) message controller 270 is capable of determining channel resources that are available for performing message flows in accordance with the principles of present invention, as well as the conventional message flows described in FIGS. 3 and 4. According to an advantageous embodiment of the present invention, CCCH message controller 270 may assign a common control channel to MS 111 for a dedicated use for a specific short message or messages (process step 505). For example, CCCH message controller 270 may initiate a data burst message that comprises a mobile station (e.g., MS 111) assigned channel identification (ID) field, a channel address field, and a user content field for transmittal to MS 111. Alternatively, the data burst may contain only the MS assigned channel ID field and channel address field that has been assigned MS 111 (process step 510). MS 111 then parses the Page message or Data Burst message and transmits the MS ACK Order message during the assigned time slot (process step 515). BS 101 either receives the MS ACK Order message during the assigned time slot, or the internal timer of BS 101 expires (process step 520).

CCCH message controller 270 gives a channel assignment for a specific period of time and duration. CCCH message controller 270 determines a time slot that is available on the common control channel assigned to MS 111. This time slot may be measured in milliseconds, such as ten to twenty milliseconds long, and the whole message is transmitted in that time slot. Because CCCH message controller 270 dedicates a portion of the reverse channel to MS 111 for the transmission of a Page Response message or a MS ACK Order message, there is little or no interference and no need for multiple access probes. BS 101 may assign the common channel for one or more mobile messages. Also, MS 111 may choose not to send fields related to Mobile identity and Pilot reports.

Because MS 111 is able to send a Page Response message or a MS ACK Order message in a collision-free channel, less transmit power may be used, thereby saving battery life. Also, the response messages may be shorter without pilot channel reports and addressing fields. Overall, wireless network 100 has less interference, and reduced collisions improve system capacity. Service Providers may better utilize system resources and the improved mobile battery life helps introduce new value-added services.

Base station assigns channel resource for approximately layer 2 acknowledgment timer duration and adds following fields on the forward channel message:
1) RA_INCL (1 bit);
2) LONG_CODE_MASK_TYPE (1 bit);
3) R_CCCH_ADDRESS (5 bits); and
4) CPCCH_ID (2 bits).

BS 101 releases channel resource after receiving the mobile station response or until a timer expires. MS 111 uses software to parse the Reliable Acknowledgment (RA) related (RA-INCL) fields. MS 111 may use either an electronic serial number (ESN) based public long code mask or a R-CCCH scheduled long code mask (specified by BS 101) to spread the response message(s) based on the value of LONG_CODE_MASK_TYPE. The R_CCCH_ADDRESS field represents the specific slot in which MS 111 may send a response message. The CPCCH_ID filed represents the identification of power control indicators transmitted on the forward common channel.

Figure 6:
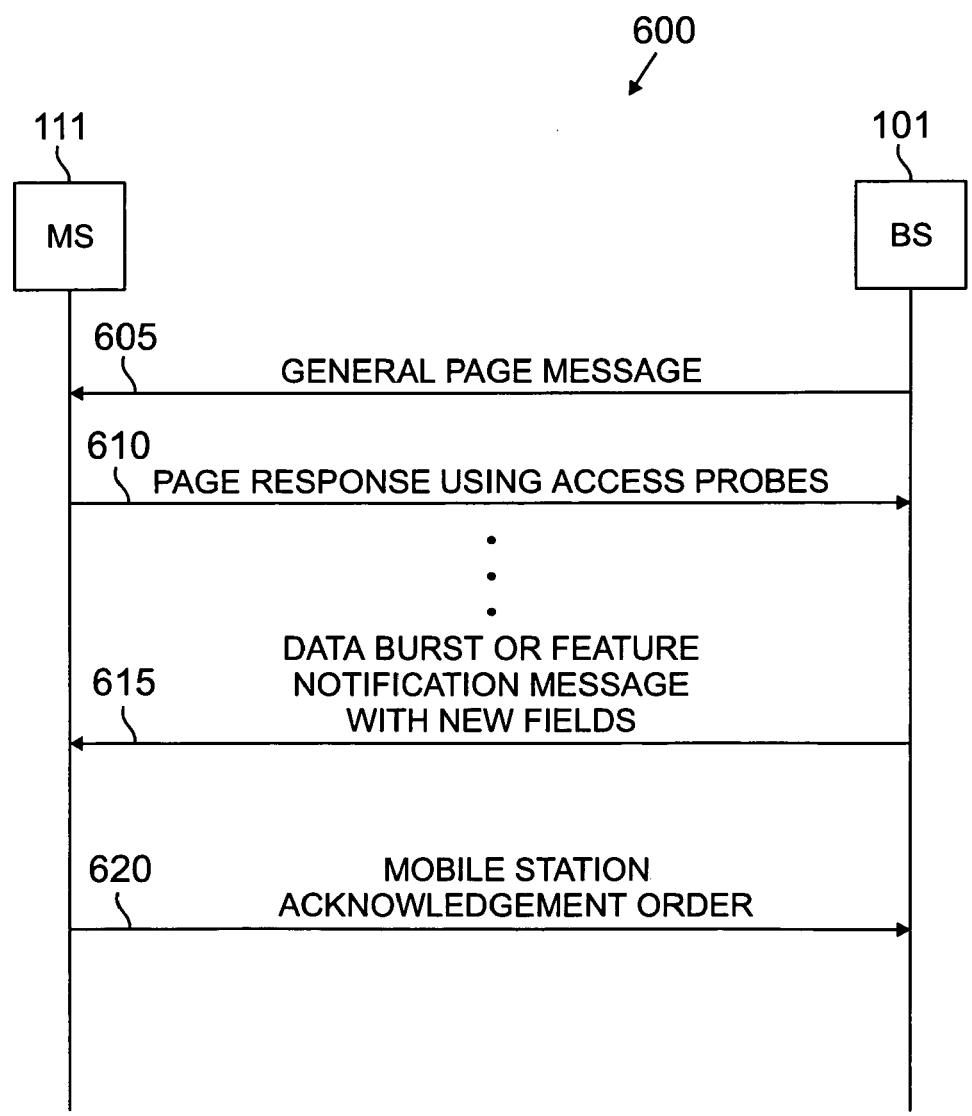
FIG. 6 illustrates a message flow diagram in which a base station initiates a data or value-added service message flow according to an exemplary embodiment of the present invention.

FIG. 6 illustrates message flow diagram 600, in which base station 101 initiates a data or value-added service message flow according to an exemplary embodiment of the present invention. BS 101 transmits General Page message 605 to MS 111 on a forward common channel, such as a paging channel. MS 111 responds by sending Page Response message 610 on the reverse common channel (access channel) using successive access probes, as in FIGS. 3 and 4. As before, the access probes are transmitted with incremental increases in power until MS 111 receives Data Burst message 615 (or Feature Notification message 615) which contains the new fields according to the principles of the present invention. If MS 111 properly receives Data Burst (Feature Notification) message 415, MS 111 transmits Mobile Station (MS) Acknowledgment (ACK) order message 620 during the assigned time slot. Because of the reduced interference, MS ACK order message 620 needs to be transmitted only once. Finally, BS ACK Order message is not needed, unlike the prior art systems depicted in FIGS. 3 AND 4.

Although the present invention has been described in detail, those skilled in the art should understand that they can make various changes, substitutions and alterations herein without departing from the spirit and scope of the invention in its broadest form.

What is claimed is:

1. For use in a base station, an apparatus for sending and receiving an acknowledgment message, comprising:
   a channel controller adapted to assign a common control channel to a mobile station, said common control channel having a forward control channel and a reverse control channel, wherein said channel controller is adapted to dedicate said forward control channel and said reverse control channel to said mobile station for a predetermined period of time; and
   a transceiver coupled to said channel controller adapted for transmitting and receiving said acknowledgment message on said common control channel.

2. The apparatus as set forth in claim 1 wherein said base station is adapted to broadcast a paging message to said mobile station.

3. The apparatus as set forth in claim 2 wherein said paging message compnses identification of said common control channel.

4. The apparatus as set forth in claim 1 wherein said base station further comprises a timer associated with said channel controller for regulating the time that said common control channel is available for said mobile station.

5. The apparatus as set forth in claim 4 wherein said base station is adapted for assigning said common control channel to said mobile station for receiving at least one message from said mobile station.

6. The apparatus as set forth in claim 2 wherein said paging message provides limits for said time period for receiving said acknowledgment message from said mobile station.

7. The apparatus as set forth in claim 6 wherein said paging message comprises a forward channel message including fields for identifying said forward channel message as a reliable ACK message specifying a dedicated common control channel address and identity.

8. A wireless communication network comprising:
   a plurality of base stations adapted to communicate with a plurality of mobile stations dispose in a coverage are of said plurality of base stations; and
   an apparatus associated with at least one of said plurality of base stations comprises for sending and receiving an acknowledgment message comprising:
      a channel controller adapted to assign common control channel to a mobile station, said common control channel having a forward control channel and a reverse control channel, wherein said channel controller is adapted to dedicate said forward control channel and said reverse control channel to said mobile station for a predetermined period of time; and
      a transceiver coupled to said channel controller adapted for transmitting and receiving said acknowledgment message on said common control channel.

9. The wireless communication network as set forth in claim 8 wherein said base station is adapted for broadcasting a paging message to said mobile station.

10. The wireless communication network as set forth in claim 9 wherein said paging message comprises identification of said common control channel.

11. The wireless communication network as set forth in claim 8 wherein said base station further comprises a timer associated with said channel controller for regulating the time that said common control channel is available for said mobile station.

12. The wireless communication network as set forth in claim 11 wherein said base station is adapted for assigning said common control channel to said mobile station for receiving at least one message from said mobile station.

13. The wireless communication network as set forth in claim 8 wherein said paging message provides limits for said time period for receiving said acknowledgment message from said mobile station.

14. The wireless communication network as set forth in claim 13 wherein said paging message comprises a forward channel message including fields for identifying said forward channel message as a reliable ACK message specifying a dedicated common control channel address and identity.

15. For use in a base station, a method for sending and receiving an acknowledgment message comprising the steps of:
assigning a common control channel having a forward control channel and a reverse control channel to a mobile station, wherein said forward control channel and said reverse control channel are dedicated to said mobile station for a predetermined period of time;
transmitting a paging message to said mobile station, said paging message operable to cause said mobile station to transmit and receive on said common control channel during said predetermined period of time; and
receiving said acknowledgment message from said mobile station on said common control channel.

16. The method as set forth in claim 15 wherein said paging message comprises identification of said common control channel.

17. The method as set forth in claim 16 further comprising the step of regulating the time that said common control channel is available for use by said mobile station.

18. The method as set forth in claim 15 further comprising the step of assigning said common control channel to said mobile station for receiving at least one message from said mobile station.

19. The method as set forth in claim 15 further comprising the steps of providing limits for said time period for receiving said acknowledgment message from said mobile station.

20. The method as set forth in claim 19 wherein said paging message comprises a forward channel message including fields for identifying said forward channel message as a reliable ACK message specifying a dedicated common control channel address and identity.

* * * * *

UNITED STATES PATENT AND TRADEMARK OFFICE
CERTIFICATE OF CORRECTION

| | | |
|---|---|---|
| PATENT NO. | : 7,069,011 B2 | Page 1 of 1 |
| APPLICATION NO. | : 10/006315 | |
| DATED | : June 27, 2006 | |
| INVENTOR(S) | : Neerav N. Dalal and Sanjay D. Kulkarni | |

It is certified that error appears in the above-identified patent and that said Letters Patent is hereby corrected as shown below:

Column 8, line 30, delete "compnses" and replace with --comprises--;

Column 8, line 55, delete "comprises".

Signed and Sealed this

Fourteenth Day of November, 2006

JON W. DUDAS
*Director of the United States Patent and Trademark Office*